United States Patent
Trout

(10) Patent No.: US 9,324,228 B2
(45) Date of Patent: Apr. 26, 2016

(54) PIPE SYSTEM, AND PIPE FLOW MONITORING AND ALERTING SYSTEMS AND METHODS

(71) Applicant: William G. Trout, Elgin, IN (US)

(72) Inventor: William G. Trout, Elgin, IN (US)

(73) Assignee: Steelhead Innovations, LLC, Elgin, IL (US)

( * ) Notice: Subject to any disclaimer, the term of this patent is extended or adjusted under 35 U.S.C. 154(b) by 0 days.

(21) Appl. No.: 14/292,847

(22) Filed: May 31, 2014

(65) Prior Publication Data

US 2015/0348395 A1 Dec. 3, 2015

(51) Int. Cl.
*G08B 21/00* (2006.01)
*G08B 21/20* (2006.01)
*G01M 3/28* (2006.01)

(52) U.S. Cl.
CPC ............. *G08B 21/20* (2013.01); *G01M 3/2807* (2013.01); *G01M 3/2815* (2013.01); *G01M 3/28* (2013.01); *Y10T 137/0318* (2015.04)

(58) Field of Classification Search
CPC ....... G01F 5/00; G01M 3/002; G01M 3/2807; G01M 3/02; G01M 3/28; G01M 3/243; G01M 3/2815; G01M 3/2876; G01M 3/3254; Y10T 137/0318; Y10T 137/0368; Y10T 137/5762; Y10T 137/7759; Y10T 137/7761; Y10T 137/86389; Y10T 137/86734; Y10T 137/87298; Y10T 137/87507
USPC .............................................. 340/605; 73/202
See application file for complete search history.

(56) References Cited

U.S. PATENT DOCUMENTS

| | | | | |
|---|---|---|---|---|
| 3,948,083 A * | 4/1976 | Wickham | ................ | B60T 13/26 116/55 |
| 5,046,519 A * | 9/1991 | Stenstrom | ................ | F17D 5/02 137/1 |
| 5,056,554 A * | 10/1991 | White | ................ | E03B 7/12 137/312 |
| 5,568,825 A * | 10/1996 | Faulk | ................ | 137/624.11 |
| 5,655,561 A * | 8/1997 | Wendel | ................ | G01F 23/243 137/312 |
| 5,893,388 A * | 4/1999 | Luker | ................ | 137/456 |
| 6,209,576 B1 * | 4/2001 | Davis | ................ | 137/487.5 |
| 8,606,413 B2 * | 12/2013 | Picton | ................ | 700/282 |
| 8,720,481 B2 * | 5/2014 | Guy | ................ | E03B 7/071 137/486 |
| 8,749,393 B1 * | 6/2014 | Tollefson | ................ | G01M 3/2876 137/460 |
| 9,010,360 B1 * | 4/2015 | Older | ................ | F16K 21/16 137/486 |
| 2002/0088491 A1 * | 7/2002 | Yanagisawa et al. | ......... | 137/456 |
| 2002/0101355 A1 * | 8/2002 | Young | ................ | G01F 1/26 340/606 |
| 2005/0011252 A1 * | 1/2005 | Arima | ................ | G01M 3/2815 73/40.5 R |
| 2005/0183500 A1 * | 8/2005 | Kanouda et al. | ............. | 73/202.5 |
| 2006/0244616 A1 * | 11/2006 | Hill | ................ | G01M 3/165 340/604 |
| 2006/0278281 A1 * | 12/2006 | Gynz-Rekowski | ..... | E21B 33/10 137/554 |
| 2007/0095400 A1 * | 5/2007 | Bergquist | ................ | F16K 7/14 137/485 |
| 2009/0025472 A1 * | 1/2009 | Garvin | ................ | 73/202 |
| 2009/0320552 A1 * | 12/2009 | Samani | ................ | 73/1.16 |

(Continued)

*Primary Examiner* — Firmin Backer
*Assistant Examiner* — Adnan Aziz
(74) *Attorney, Agent, or Firm* — Michael W. Goltry; Robert A. Parsons; Parsons & Goltry

(57) ABSTRACT

A pipe system includes a pipe for containing a pipe flow therethrough having a first flow rate, a sampling tube coupled in fluid communication to the pipe for receiving and containing a portion of the pipe flow therethrough, for interacting with the portion of the pipe flow therethrough so as to form a second flow rate of the portion of the pipe flow being an amplification of the first flow rate, and for returning the portion of the pipe flow to the pipe, and a sensor for sensing the second flow rate and for transmitting a signal being a function of the second flow rate.

6 Claims, 3 Drawing Sheets

(56) References Cited

U.S. PATENT DOCUMENTS

| | | | |
|---|---|---|---|
| 2010/0212748 A1* | 8/2010 | Davidoff | 137/10 |
| 2012/0180877 A1* | 7/2012 | Pallais | 137/487.5 |
| 2013/0112007 A1* | 5/2013 | Adler et al. | 73/861.08 |
| 2013/0205892 A1* | 8/2013 | Ueda et al. | 73/202 |
| 2013/0291974 A1* | 11/2013 | Bourgeois | F17D 5/02 137/625.3 |

* cited by examiner

PIPE SYSTEM, AND PIPE FLOW MONITORING AND ALERTING SYSTEMS AND METHODS

FIELD OF THE INVENTION

The present invention relates to plumbing and, more particularly, to systems and methods for monitoring plumbing for leaks.

BACKGROUND OF THE INVENTION

Plumbing includes all of the piping and fixtures that provide water for drinking, cooking, bathing, laundry, and watering, as well as a means of disposing of wastewater. As a result of age and wear, plumbing failures routinely occur resulting in water leaks. Left unchecked, plumbing water leaks can cause flooding and significant structural damage. Moreover, water leaks in the plumbing of a building construction when the building construction is left unoccupied for extended periods of time can lead to substantial flooding and often catastrophic structural damage. Irrigation plumbing water leaks left unattended can compromise soil stability, kill low water use plantings, and produce pooled water that could leak into adjacent building construction.

There is no known way to produce leak-proof plumbing. As a result, those skilled in the art will readily appreciate that the incidence of water leaks and plumbing is, and will continue to remain, a persistent and ongoing problem. Accordingly, what is needed in the art is a cost-effective and practicable way to monitor plumbing for leaks and anomalous flow conditions and to provide useful notifications of potential leaking for preventative redress.

SUMMARY OF THE INVENTION

According to the principle of the invention, a pipe system includes a pipe for containing a pipe flow therethrough having a first flow rate, a sampling tube coupled in fluid communication to the pipe for receiving and containing a portion of the pipe flow therethrough, for interacting with the portion of the pipe flow therethrough so as to form a second flow rate of the portion of the pipe flow being an amplification of the first flow rate, and for returning the portion of the pipe flow to the pipe, and a sensor for sensing the second flow rate and for transmitting a signal being a function of the second flow rate. The sensor transmits the signal to a device. In one embodiment, the device is a signal device that issues an alert in response to the signal from the sensor. In one embodiment, the signal device is an aural signal device, and the alert is an audible alert. In a particular embodiment, the audible alert is a pre-recorded audible verbal message. In another embodiment, the signal device is a visual signal device, and the alert is a visual alert. In a particular embodiment, the visual alert is a pre-recorded text message. In yet a further embodiment, the device is at least one valve for halting the pipe flow through the pipe and the sampling tube in response to the signal from the sensor. In still a further embodiment, the sensor transmits the signal to a first valve for halting the pipe flow through the pipe, and a second valve for halting the pipe flow through the sampling tube.

According to the principle of the invention, a pipe system includes a pipe for containing a pipe flow therethrough having a first flow rate, and a sampling tube that includes an upstream end coupled in fluid communication to an upstream portion of the pipe, and a downstream end coupled in fluid communication to a downstream portion of the pipe. A first sensor is for sensing the first flow rate and for transmitting a first signal being a function of the first flow rate. A diversion valve is operatively coupled to the first sensor for halting the pipe flow through the pipe between the upstream and downstream ends of the sampling tube in response to the first signal from the sensor for diverting a portion of the pipe flow to the sampling tube through the upstream end thereof. The sampling tube is for containing the portion of the pipe flow therethrough from the upstream end to the downstream end, for interacting with the portion of the pipe flow therethrough so as to form a second flow rate of the portion of the pipe flow being an amplification of the first flow rate, and for returning the portion of the pipe flow to the pipe through the downstream end. A second sensor is for sensing the second flow rate and for transmitting a second signal being a function of the second flow rate. The sensor transmits the signal to a device. In one embodiment, the device is a signal device that issues an alert in response to the signal from the sensor. In one embodiment the signal device is an aural signal device, and the alert is an audible alert. In a particular embodiment, the audible alert is a pre-recorded audible verbal message. In another embodiment, the signal device is a visual signal device, and the alert is a visual alert. In a particular embodiment, the visual alert is a pre-recorded text message. In still a further embodiment, the device is at least one valve for halting the pipe flow through the pipe and the sampling tube in response to the second signal from the second sensor. In yet still a further embodiment, the second sensor transmits the second signal to the diversion valve for halting the pipe flow through the pipe, and to a sampling tube valve for halting the portion of the pipe flow through the sampling tube.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Incompressible liquid flow through a pipe is used in fluid distribution networks. Of particular significance is plumbing, which includes all the pipes and fixtures that provide water for drinking, cooking, bathing, and laundry in building constructions. The water used in building constructions, particular residential building constructions, is pumped under pressure, normally in a standard range of 30-80 psi, through pipes to predetermined destinations, including the water softener, the water heater, the sinks, the tub, the shower, the dishwasher, the ice maker, and the like. The water flow through the pipes is internal in that the water is forced to flow in the pipes. The internal water flow through a pipe is a "pipe flow." The term "pipe flow" is a term of art in the field of plumbing meaning that a pipe is filled with water and the flow of the water through the pipe is driven by pressure, such as in the standard range of 30-80 psi, and is an incompressible flow in that the water density is constant within a fluid parcel, which is defined as an infinitesimal volume that moves with the velocity of the water. Leaks in the pressurized plumbing in the residential building constructions are, unfortunately, common, and if left undetected, even slow leaks, can cause substantial damage to the home leading to expensive repairs. The invention concerns a pipe flow through a pipe of a plumbing system, and to systems and methods for monitoring the pipe flow through a pipe for leak detection and alerting purposes.

Figure 1:
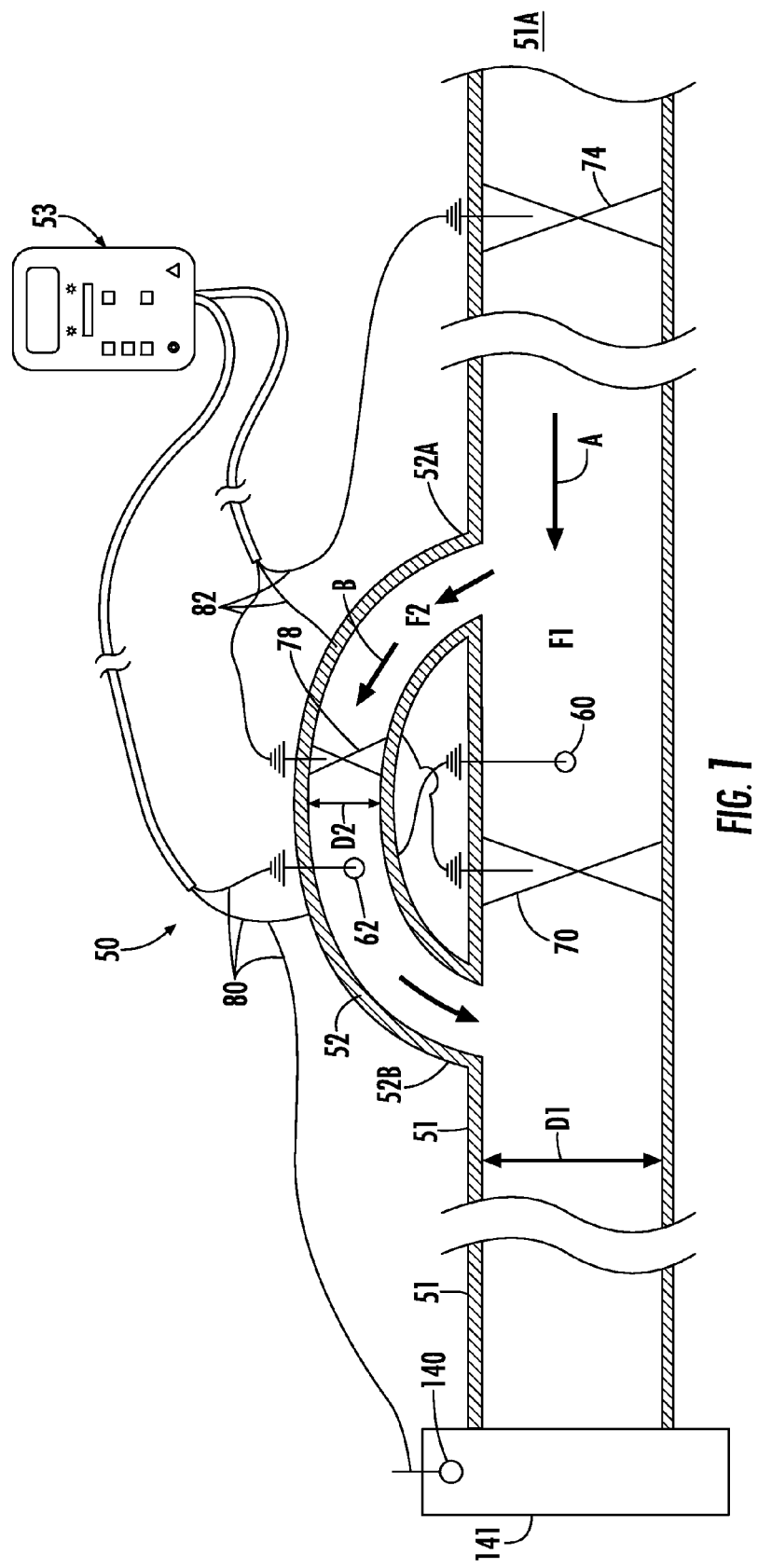
FIG. 1 is a highly generalized representation of a pipe system constructed and arranged in accordance with the principle of the invention, the pipe system including a sampling tube coupled in fluid communication to a pipe, flow sensors and electronic valves associated with the sampling tube and the pipe, and a control unit operatively coupled to the flow sensors and to the electronic valves.

Turning now to the drawings, in which like reference characters indicate corresponding elements throughout the several views, attention is first directed to FIG. 1 in which there is seen a highly generalized representation of a pipe apparatus/system 50 including pipe 51, sampling tube 52 coupled in fluid communication to pipe 51, a control unit 53, flow sensors 60 and 62, and electronic valves 70, 74, and 78. Pipe 51 and sampling tube 52 form a part of a plumbing system or network in a building construction, such as a residential building construction, and are fashioned of the customary plastic, polyvinyl chloride (PVC), copper, or other material or combination of materials commonly used for conduits used in conventional plumbing used to provide water for drinking, cooking, bathing, laundry, watering, and the like, throughout a building construction, such as a residential home. Pipe 51 and sampling tube 52 are plumbed together in fluid communication using conventional techniques well known to the skilled plumber, and the representation of pipe 51 and sampling tube 52 is highly generalized.

Pipe 51 is an elongate conduit or hollow body or flow section of circular cross section having a constant circular inner diameter D1 for containing incompressible pipe flow F1 of water therethrough and conducting pipe flow F1 in the direction of arrowed line A from an upstream location, denoted for example at 51A, to a downstream location, denoted for example at 51B, for application to a chosen destination/fixture, such as a water softener, a water heater, a sink, a tub, a shower, a toilet, a dishwasher, an ice maker, etc. Pipe 51 has a circular cross section to allow it to withstand pressure differences between the inside and the outside without undergoing significant distortion as is common in the piping of plumbing systems. Pipe 51 is a supply pipe for conducting water from upstream location 51A to downstream location 51B for supplying a chosen or preselected destination/fixture with water for a chosen or preselected purpose.

Sampling tube 52 is coupled in fluid communication to pipe 51 for receiving and containing incompressible pipe flow F2 of water therethrough diverted therein or otherwise supplied from pipe flow F1 of pipe 51. Sampling tube 52 is an elongate conduit or hollow body or flow section of circular cross section having upstream end 52A, downstream end 52B, and constant circular inner diameter D2 between upstream end 52A and downstream end 52B. Sampling tube 52 is between upstream location 51A and downstream location 51B. Upstream end 52A is upstream in a direction toward upstream location 51A and downstream end 52B is downstream of upstream end 52A in the opposite direction toward downstream location 51B. Upstream end 52A is coupled in fluid communication to upstream portion of pipe 51 in a direction toward upstream location 51A, and downstream end 52B is coupled in fluid communication to downstream portion of pipe 51 in a direction toward downstream location 51B. Sampling tube 52 does not directly supply water to any fixture in the building construction. Specifically, sampling tube 52 is for receiving pipe flow F2 from pipe flow F1 of pipe 51, and containing pipe flow F2 therethrough from upstream end 52A to downstream end 52B, and for returning pipe flow F2 back to pipe 51 through downstream end 52B and thus back to pipe flow F1.

Diameter D2 of sampling tube 52 is smaller than diameter D1 of pipe 51. Thusly, pipe 51 is a large diameter pipe, and sampling tube 52 is a comparatively small diameter tube. In an example, in the present embodiment diameter D1 of pipe is one inches, and inner diameter D2 of sampling tube 52 is ¼ of an inch. Accordingly, pipe 51 is a one inch inner diameter D1 pipe and sampling tube 52 is a ¼ inch inner diameter D2 tube. And so in this example, inner diameter D1 of pipe 51 is four times larger than the comparatively smaller inner diameter D2 of sampling tube 52.

As mentioned above, sampling tube 52 is coupled in fluid communication to pipe 51 for receiving and containing pipe flow F2 therethrough from pipe flow F1 through pipe 51. Because diameter D2 of sample tube 52 is less than inner diameter D1 of pipe, sample tube 52 provides a constricted flow relative to pipe 51 and is physically incapable of containing the entire pipe flow F1 of pipe 51 at one time. Accordingly, pipe flow F2 is a portion or fraction of pipe flow F1. Because inner diameter D1 of pipe 51 is four times larger than inner diameter D2 of sampling tube 52, in this embodiment pipe flow 52 through sampling tube 52 is one-fourth of pipe flow F1 through pipe 51. And so as pipe flow F2 from pipe flow F1 enters sampling tube 52 that narrows relative to pipe 51, according to Bernoulli's Principle the water of pipe flow F2 through sampling tube 52 flows more quickly that pipe flow F1 through pipe 51 and the water pressure of pipe flow F2 through sampling tube 52 is decreased relative to the water pressure of pipe flow F1 through pipe 51.

Flow sensors 60 and 62 are operatively coupled in signal communication with control unit 53. Flow sensors 60 and 62 are entirely conventional and well-known flow sensors of a type for measuring flow rate, both terms of flow velocity rate being velocity of fluid over a known area and also volumetric flow rate being the volume of fluid which passes through a given surface per unit time, and for generating output signals to control unit 53 that are a function of flow rate. Flow sensor 60 is associated with pipe 51 and is for sensing pipe flow F1 rate through pipe 51, and flow sensor 62 is associated with sampling tube 52 and is for sensing pipe flow F2 rate through sampling tube 52. The installation of flow sensors 60 and 62 with pipes for measuring flow rates is well known in the art, the details of which are not discussed as they will readily occur to the skilled artisan. The fluid velocity in a pipe changes from zero at the surface because of the no-slip condition to a maximum at the pipe center, namely, the center of the inner diameter of the pipe. Accordingly, flow sensor 60 is located at the center of inner diameter D1 of pipe 51 for sensing flow rates of pipe flow F1 through pipe 51, in terms of flow velocity and volumetric flow, and flow sensor 62 is located at the center of inner diameter D2 of sample tube 52 for sensing flow rates of pipe flow F2 through sample tube 52, in terms of flow velocity and volumetric flow. Electronic valves 70, 74, and 78, are, like flow sensors 60 and 62, operatively coupled to control unit 53 and are entirely conventional and well-known electronic valves of the type for closing for halting a pipe flow through a pipe, and for opening for allowing a pipe flow to flow unrestricted through a pipe. The installation of electronic valves with a pipe is well known in the art, the details of which are not discussed as they will readily occur to the skilled artisan. Flow sensors 60 and 62 are coupled in signal communication with electronic valves 70, 74, and 78 via control unit 53.

Control unit 53 is operatively coupled to flow sensors 60 and 62 for receiving and responding to output signals from flow sensors 60 and 62, and is operatively coupled to electronic valves 70, 74, and 78 for selectively opening and closing electronic valves 70, 74, and 78 in response to output signals from flow sensors 60 and 62. Control unit 53 is operatively coupled to flow sensors 60 and 62 with conventional electrical wiring 80, and is operatively coupled to electronic valves 70, 74, and 78 with conventional electrical wiring 82. And so control unit 53 provides an operative coupling between, on the one hand, flow sensors 60 and 62, and, on the other hand, electronic valves 70, 74, and 78.

Figure 2:
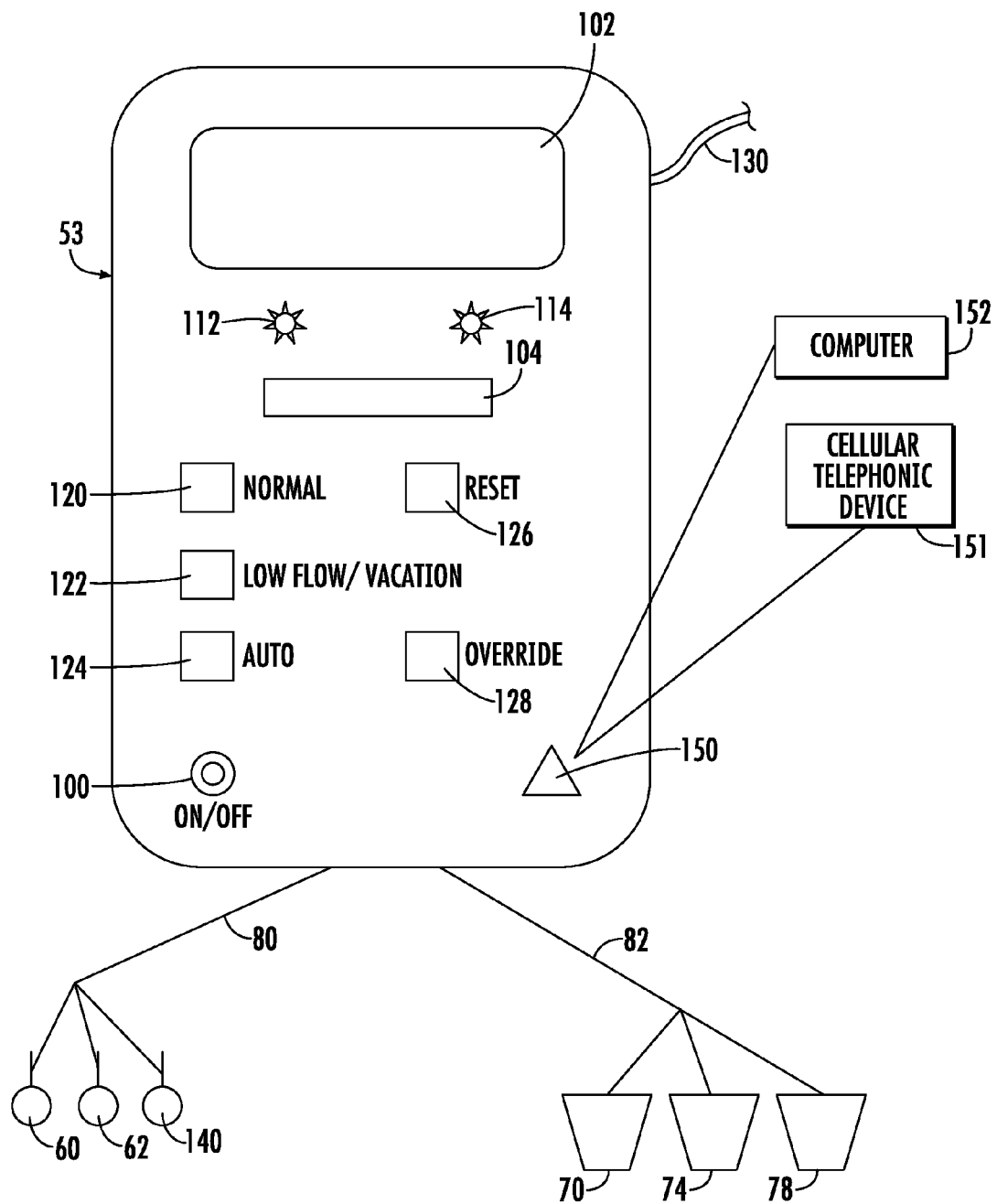
FIG. 2 is an enlarged, highly generalized front elevation view of the control unit FIG. 1.
Figure 3:
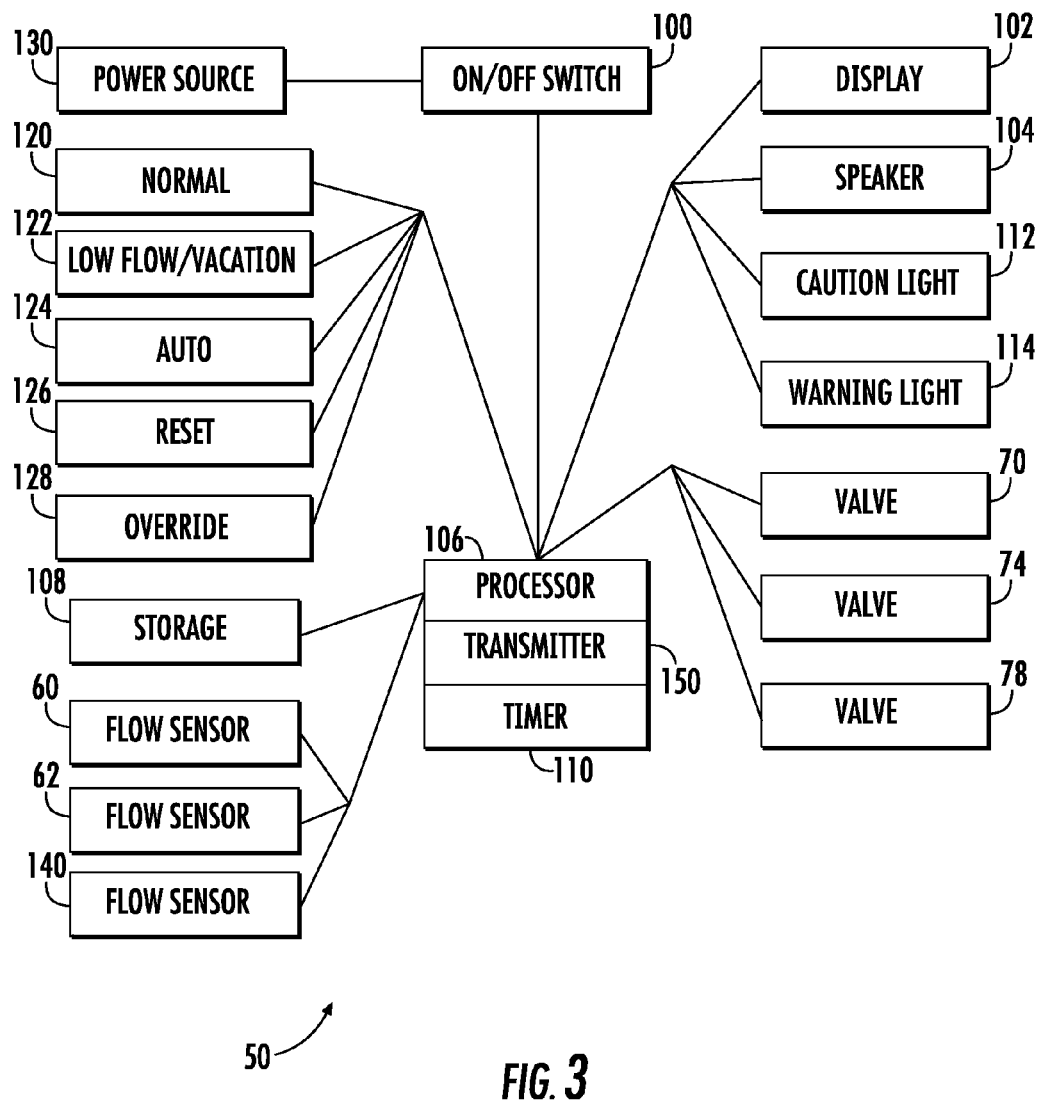
FIG. 3 is a schematic representation of the pipe system of FIG. 1.

Referring in relevant part to FIGS. 2 and 3, control unit 53 include ON/OFF switch 100, electronic display 102, speaker 104, processor 106, storage 108, timer 110, lights 112 and 114, and mode switches including normal mode switch 120, low flow/vacation mode switch 122, and auto mode switch 124, reset switch 126, and override switch 128. Electrical wiring 80 operatively couples control unit 53 to flow sensors 60 and 62, and electrical wiring 82 operatively couples control unit 53 to electronic valves 70, 74, and 78. Control unit 53 is thus electrically connected between, on the one hand, flow sensors 60 and 62 via electrical wiring 80 and, on the other hand, electronic valves 70, 74, and 78 via electrical wiring 82, and again provides an operative coupling between, on the one hand, flow sensors 60 and 62, and, on the other hand, electronic valves 70, 74, and 78. Control unit 53 is electrically connected to power source 130 that provides electrical power to all control unit 53 components, flow sensors 60 and 62 via electrical wiring 80, and electronic valves 70, 74, and 78 via electrical wiring 82. Display 102, speaker 104, and lights 112 and 114 are signal devices of control unit 53, which are each configured to issue alerts/signals. Display 102 is a device of control unit 53 that emits visual signals in the form of text messages that are capable of being seen and read. Speaker 104 is a device of control unit 53 that emits audible signals, stimuli, or alarms capable of being heard, and lights 112 and 114 emit visual signals, stimuli, or alarms capable of being seen. ON/OFF switch 100, electronic display 102, speaker 104, processor 106, storage 108, timer 110, lights 112 and 114, mode switches 120, 122, and 124, reset switch 126, and override switch 128, are electrically connected with conventional electronic circuitry. And so through conventional circuitry incorporated in control unit 53, processor 106 of control unit 53 is operatively coupled to power source 130, storage 108, and to the signal devices of control unit 53 including display 102, speaker 104, lights 112 and 114, mode switches 120, 122, and 124, reset switch 126, and override switch 128. Processor 106 of control unit 53 is, in turn, operatively coupled to flow sensors 60 and 62 via conventional electrical wiring 80, and is operatively coupled to electronic valves 70, 74, and 78 via conventional electrical wiring 82. Display 102 is a conventional electronic display commonly found in home thermostats, speaker 104 is a conventional aural device commonly found in cellular phones and the like that is operative to emit audible stimuli, signals, or alarms, processor 106 is a conventional and well known processor, storage 108 is conventional electronic storage for containing instructions that when executed by processor 106 perform the functions of control unit 53, timer 110 is a conventional electronic timer, lights 112 and 114 are each a conventional light source operative to emit illumination and are each preferably a light-emitting diode (LED), mode switches 120, 122, and 124 are each conventional electronic selector switches used to set the mode of operation of control unit 53 and flow sensors 60 and 62 and electronic valves 70, 74, and 78, reset switch 126 is a conventional electronic selector switch used to reset control unit 53 and flow sensors 60 and 62 and electronic valves 70, 74, and 78, and override switch 128 is a conventional electronic selector switch used to override control unit 53 and flow sensors 60 and 62 and electronic valves 70, 74, and 78.

ON/OFF switch 100 is the main ON/OFF switch of control unit 53 and is a conventional and readily available toggle switch movable between an ON position empowering and activating control unit 53 and the various elements thereof in addition to flow sensors 60 and 62 and electronic valves 70, 74, and 78, and an OFF position deactivating such components. In the discussion of the operation of pipe system 50, ON/OFF is enabled in the ON position. If desired, control unit 53 can be furnished with a power indicator light that illuminates in the ON position of switch 100 to provide a visual indication that control unit 53 is activated or otherwise powered up in preparation for use in conjunction with flow meters 60 and 62 and electronic valves 70, 74, and 78, and does not illuminate in the OFF position of switch 100 to provide a visual indication that control unit 53 and flow sensors 60 and 62 and electronic valves 70, 74, and 78 are deactivated or otherwise powered down.

Control unit 53 is located in the building construction having a plumbing system incorporating pipe system 50. Control unit 53 is mounted to a wall, like a thermostat. Pipe system 50 operates in an AC-powered environment, and power source 130 is a dedicated AC power source of a building construction incorporating pipe system 50 that is wired to control unit 53 utilizing conventional wiring techniques well known to the skilled electrician. In the ON position of switch 100, AC electrical power from power source 53 powers control unit 53, flow sensors 60 and 62, and electronic valves 70, 74, and 78.

Processor 106 is preprogrammed with instructions maintained in storage 108 that when executed by processor 106 operates control unit 53 in conjunction with flow sensor 60 and electronic valves 70, 74, and 78 according to the following discussion of the apparatus functions and methods of pipe system 50. Pipe system 50 operates in a normal mode via activation of normal mode switch 120, operates in a low flow or vacation mode via activation of low flow/vacation mode switch 122, and operates in an automatic mode via activation of auto mode switch 124.

In the normal mode of operation pipe system 50 via activation of normal mode switch 120, processor 106 is responsive closing electronic valve 78 preventing pipe flow F2 therethrough which remains closed if already closed, opening electronic valves 70 and 74 permitting unrestricted pipe flow F1 through pipe 51, and activating flow sensor 60, which is for generating output signals to processor 106 of control unit 53 that are a function of flow rates/conditions of pipe flow F1 through pipe 51, including, in this example, a reference flow duration of time, a caution flow duration of time, and a warning flow duration of time, each of which is considered a flow rate or a flow condition. Flow sensor 60 is in a safe state throughout the reference flow duration to inside of the caution flow duration, is in a caution state throughout the caution flow duration to inside of the warning flow duration, and is in a warning state throughout the warning flow duration beyond the caution flow duration.

In response flow sensor 60 initially detecting a flow rate of pipe flow F1 through pipe 51, whether the flow rate is sensed by flow sensor 60 in terms of flow velocity or volumetric flow, the reference flow duration begins and is a predetermined length of time that flow sensor 60 continually detects a flow rate of pipe flow F1 through pipe 51 from a starting time when flow sensor initially detects a flow rate of pipe flow F1 through pipe 51 to an ending time inside of the commencement of the caution flow duration, the caution flow duration is a predetermined length of time that flow sensor 60 continues to detect a flow rate of pipe flow F1 through pipe 51 from a starting time at the end of the reference flow duration to an ending time inside of the commencement of the warning flow duration, and the warning flow duration is a predetermined length of time that flow sensor 60 further continues to detect a flow rate of pipe flow F1 through pipe 51 from and beyond a starting time at the end of the caution flow duration. In a particular embodiment, the reference flow duration of time is five minutes, the caution flow duration of time is from five minutes to ten minutes, and the warning flow duration of time is from ten minutes and beyond. Other durations of time can be used for the reference flow duration of time, the caution flow duration of time, and the warning flow duration of time, such as two, three, and four minutes respectively, ten, fifteen, and twenty minutes, respectively, etc. The reference flow duration of time can be one hour, two hours, 3 hours, or other time, the caution flow duration of time can be a preselected length of time beyond the reference flow duration, such as five minutes, ten minutes, fifteen minutes or other preselected duration of time, and the warning flow duration of time is then from and beyond the caution flow duration of time.

The signal devices of control unit 53 are each operatively coupled to flow sensor 60 via processor 106 issuing a caution alert/signal in response to the caution state of flow sensor 60, and issuing a warning alert/signal different from the caution alert/signal in response to the warning state of flow sensor 60, display 102 emitting visual caution/warning visual signals in the form of text messages that are capable of being seen and read, speaker 104 emitting caution/warning audible signals, stimuli, or alarms capable of being heard, and lights 112 and 114 emitting caution/warning visual signals, stimuli, or alarms capable of being seen. In the caution state flow sensor 60 issues a caution signal to processor 106, and in the warning state flow sensor 60 issues a warning signal to processor 106. Processor 106 is responsive the caution signal for activating the signal devices of control unit 53 to issue caution alerts/signals, and is responsive to the warning signal for activating the signal devices of control unit to issue warning alerts/signals.

As a matter of example, the caution visual signal issued by display 102 in the caution state of flow sensor 60 is a text message that is capable of being seen and read, and which is, for example, "Caution, excessive water flow condition detected. Check for overuse or possible leak." The warning visual signal issued by display 102 in the warning state of flow sensor 60 is a text message that is capable of being seen and read, and which is, for example, "Warning, highly excessive water flow condition detected. Check for overuse or possible leak." The caution audible stimulus or alarm issued by speaker 104 in a caution state of flow sensor 60 is a soft, shrill, and yet easily heard noise, serious of noises, or pattern of noises so as to be indicative of the caution state of flow sensor 60, and the warning audible stimulus or alarm issued by speaker 104 in the warning state of flow sensor 60 is a comparatively loud, shrill, and easily heard different noise, different series of noises, or different pattern of noises so as to be indicative of warning state of flow sensor 60. The caution and warning audible signals issued by speaker 104 may, in an alternate embodiment, be different pre-recorded verbal caution and warning messages, which are housed or otherwise stored in storage 108 and accessed by processor 106 for playing through speaker 104 in response to the caution state and warning state of flow sensor 60. As a matter of example, the pre-recorded verbal caution message is "Caution, excessive water flow condition detected. Check for overuse or possible leak." Further, the pre-recorded verbal warning message is "Warning, highly excessive water flow condition detected. Check for overuse or possible leak." The caution visual signal or alarm issued by the light signal device of control unit 53 in the caution state of flow sensor 60 is an illumination of light 112, which emits yellow light so as to be indicative of the caution state of flow sensor 60, and the warning visual signal or alarm issued by the light signal device of control unit 53 in the warning state of flow sensor 60 is an illumination of light 114, which emits red light so as to be indicative of the caution state of flow sensor 60. The caution and warning alerts/signals issued by the various signal devices of control unit 53 via processor 106 are issued concurrently in response to the caution and warning states of flow sensor 60 to ensure the caution and warning states of flow sensor 60 are well communicated for alerting an occupant of the building construction of a potential leak condition to allow the occupant to determine the cause of the excess water use and, in the event of a leak, to repair the leak or turn the water off to pipe 51. If the occupant determines that the excessive water use is not unwanted or problematic, the user may select reset switch 126 to reset control unit 53 and flow sensor 60, whereby control unit 53 and flow sensor 60 are re-initialized and the caution/warning flow sensing as above in the normal mode of operation is recommenced. In the alternative, the user may select override switch 128 overriding or disabling the operation of control unit 53 for a predetermined override period of time, such as one hour, two hours, four hours, twelve hours, or other predetermined override period of time, which is timed by timer 110. At the close of the override period of time, timer 110 sends a resulting signal to processor 106, and processor 106 is responsive reactivating and re-initializing or re-enabling control unit 53 in the normal mode of operation resuming the normal mode of operation in the manner described above.

In a particular embodiment, in the warning state of flow sensor 60, flow sensor 60 sends the warning signal to processor 106 which, in response thereto, sends a resulting signal to electronic valve 74 closing electronic valve 74 halting pipe flow F1 through pipe 51 thereby terminating a potential leak. At this point, pipe flow F1 through pipe is restored by selecting reset switch 126 or override switch 128, whereby in response thereto in either case processor 106 is responsive sending a signal to electronic valve 74 opening electronic valve 74 restoring pipe flow F1 through pipe 51 and re-initializing control unit 53 resetting pipe system 50 to, and recommencing, the normal mode of operation. In another embodiment in addition to or in lieu of electronic valve 74, in the warning state of flow sensor 60, flow sensor 60 sends the warning signal to processor 106 which, in response thereto, sends a resulting signal to electronic valve 70 closing electronic valve 70 halting pipe flow F1 through pipe 51 terminating a potential leak. Again, pipe flow F1 through pipe is restored by selecting reset switch 126 or override switch 128, whereby in response thereto in either case processor 106 is responsive sending a signal to electronic valve 70 opening electronic valve 70, and sending a signal to electronic valve 74 opening electronic valve 74 if closed or leaving electronic valve 74 open if open, thereby restoring pipe flow F1 through pipe 51, and processor 106 is further responsive re-initializing control unit 53 resetting pipe system 50 to, and recommencing, the normal mode of operation. These steps occur concurrently in a preferred embodiment.

In the normal mode of operation pipe system 50 in an alternate embodiment via selection of normal mode switch 120, flow sensor 60 generates output signals to control unit 53 that are a function of volumetric flow rate of pipe flow F1 through pipe 51, including a reference volumetric flow rate, a caution volumetric flow rate greater than the reference volumetric flow rate and lesser than a warning volumetric flow rate, and the warning volumetric flow rate greater than the caution volumetric flow rate. Flow sensor 60 is in the safe state in the reference volumetric flow rate, is in the caution state in the caution volumetric flow rate and in response thereto sends the resulting caution signal to processor 106 as discussed above, and is in the warning state in the warning volumetric flow rate and in response thereto sends the resulting warning signal to processor 106 as discussed above.

The reference volumetric flow rate of pipe flow F1 is a predetermined range of volumetric flow rate of pipe flow F1 through pipe 51 that is equal to or less than a threshold reference volumetric flow rate of pipe flow F1, the caution volumetric flow rate of pipe flow F1 is a predetermined range of volumetric flow rate of pipe flow F1 through pipe 51 from the threshold reference volumetric flow rate of pipe flow F1 to a threshold caution volumetric flow rate of pipe flow F1, and the warning volumetric flow rate of pipe flow F1 is from and beyond the threshold caution volumetric flow rate of pipe flow F1. As a matter of example, the threshold reference volumetric flow rate is equal to and less than three gallons/minute, the caution volumetric flow rate is from three gallons/minute to the threshold caution volumetric flow rate of four gallons/minute, and the warning volumetric flow rate is from and beyond four gallons/minute. Pipe system 50 operates identically as described above in the reference, caution, and warning states of flow sensor 60.

In the low flow/vacation mode of operation pipe system 50 via activation of low flow/vacation mode switch 122, processor 106 is responsive activating flow sensor 62, opening electronic valve 74 of pipe 51 which stays open if already open, opening electronic valve 78 of sampling tube 52, and closing electronic valve 70 between upstream and downstream ends 52A and 52B of sampling tube 52 for diverting pipe flow F2 to sampling tube 52 through upstream end 52A from pipe flow F1 of pipe 51 whereby pipe flow F2 is capable of flowing through sampling tube 52 from upstream end 52A to downstream end 52B and back to pipe flow F1 of pipe 51 through downstream end 52B of sampling tube 52, and activating flow sensor 62, which is for generating output signals to control unit 53 that are a function of flow rate of pipe flow F2, whether in terms of flow velocity of pipe flow F2 in one embodiment and volumetric flow rate in another embodiment and both flow velocity and volumetric flow rate in yet another embodiment.

In the low flow/vacation mode, there is no anticipated flow of pipe flow F1 through pipe 51. Such a no flow condition is anticipated during periods of no anticipated demand of water from pipe flow F1 of pipe 51. Because pipe 51 is a large diameter pipe relative to sampling tube 52, the narrowed/reduced inner diameter D2 of sampling tube 52 compared to the comparatively larger inner diameter D1 of pipe 52 interacts with pipe flow F2 through sampling tube 52 constricting pipe flow F2 thereby amplifying any flow rate of pipe flow F1 by accelerating any flow rate of pipe flow F1 through pipe 51 via pipe flow F2 through sampling tube 52 according to Bernoulli's Principle, in which the water of pipe flow F2 through sampling tube 52 flows more quickly than pipe flow F1 of pipe 51 and the water pressure of pipe flow F2 through sampling tube 52 decreases relative to the water pressure of pipe flow F1 through pipe 51. Flow sensor 62 is in a safe state in response to no detected flow rate of pipe flow F2 through sampling tube 52, and is in a leak detecting state in response to sensing a flow rate of pipe flow F2 through sampling tube 52, again being an amplification of a flow rate of pipe flow F1 through pipe 51 so as to be detectable by flow sensor 62.

Because pipe 51 is a large diameter pipe compared to sampling tube 52 being a comparatively smaller diameter pipe, a low flow rate of pipe flow F1 is potentially not be detectable by flow sensor 60, whereas the amplified flow rate of pipe flow F1 via pipe flow F2 through sampling tube 52, i.e. an greater flow velocity of pipe flow F2 through sampling tube 52 compared to the flow velocity of pipe flow F1 through pipe 51, is comparatively more easily detectable by flow sensor 62 in sampling tube 52, in accordance with the principle of the invention.

In response to flow sensor 62 sensing a flow rate of pipe flow F2 through sampling tube 52, flow sensor 62 sends a leak detecting signal to processor 106 of control unit 53, and processor 106 is responsive activating control unit 53 signal devices. Specifically, the signal devices of control unit 53 are each operatively coupled to flow sensor 62 via processor 106 issuing a leak detection alarm/signal in response to the leak detecting state of flow sensor 62 so as to indicate a leak. Again, display 102 emits visual signals in the form of text messages that are capable of being seen and read. Speaker 104 emits audible signals, stimuli, or alarms capable of being heard, and lights 112 and 114 emit visual signals, stimuli, or alarms capable of being seen.

As a matter of example, the leak detection signal issued by display 102 in response to the leak detecting state of flow sensor 62 is a text message that is capable of being seen and read, and which is, for example, "Leak detected. Check for leak." The leak detection audible stimulus or alarm issued by speaker 104 in a leak detecting state of flow sensor 62 is a loud, shrill, and easily heard noise so as to be indicative of a leak. The leak detection audible signal issued by speaker 104 may, in an alternate embodiment, be a pre-recorded verbal leak detection message, which is housed or otherwise stored in storage 108 and accessed by processor 106 for playing through speaker 104 in response to the leak detecting state of flow sensor 62. As a matter of example, the pre-recorded verbal leak detection message is "Leak detected. Check for leak." The leak detection visual signal or alarm issued by the light signal device of control unit 53 in the leak detecting state of flow sensor 62 is an illumination of light 114, which emits red light so as to be indicative of the leak detecting state of flow sensor 62. The leak detection alerts/signals issued by the various signal devices of control unit 53 are issued concurrently in response to the caution and warning states of flow sensor 62 to ensure the leak detecting state of flow sensor 62 is well communicated for alerting an occupant of the building construction of a leak condition to allow the occupant to determine the location of the leak, and to repair the leak or turn the water off to pipe 51. If the occupant determines that there is a leak and the leak is repaired, the user may then select reset switch 126 resetting control unit 53 and flow sensor 62 and reinitializing control unit 53 and flow sensor 62 recommencing the low flow/vacation mode. In the alternative, the user may select override switch 128 overriding the operation of control unit 53 for a predetermined override period of time, such as one hour, two hours, four hours, twelve hours, or other predetermined override period of time, which is timed by timer 110. At the close of the override period of time, timer 110 sends a resulting signal to processor 106, and processor 106 is responsive reactivating and re-initializes control unit 53 in the low flow/vacation mode of operation resuming the low flow/vacation mode of operation in the manner described above.

In a particular embodiment, in the leak detecting state of flow sensor 62 processor 106 is responsive to the leak detecting signal from sensor 62 sending a signal to electronic valve 74 closing electronic valve 74 halting pipe flow F1 through pipe 51 terminating a leak. At this point, pipe flow F1 through pipe 51 is restored by selecting reset switch 126 or override switch 128, whereby in response thereto in either case processor 106 is responsive sending a signal to electronic valve 74 opening electronic valve 74 restoring pipe flow F1 through pipe 51 and re-initializing control unit 53 resetting pipe system 50 to, and recommencing, the low flow/vacation mode of operation. In another embodiment in addition to or in lieu of electronic valve 74, in the leak detecting state of flow sensor 62 processor 106 is responsive sending a signal to electronic valve 78 closing electronic valve 78 halting pipe flow F2 through sampling tube 52 terminating a leak. At this point, pipe flow F2 through sampling tube 52 is restored by selecting reset switch 126 or override switch 128, whereby in response thereto in either case processor 106 is responsive sending a signal to electronic valve 78 opening electronic valve 78 restoring pipe flow F2 through sampling tube 52 and re-initializing control unit 53 resetting pipe system 50 to, and recommencing, the low flow/vacation mode of operation. Translation between the normal mode of operation and the low flow/vacation mode of operation is carried out via selection between normal mode switch 120 and low flow/vacation mode switch 122.

In an alternate embodiment of the low flow/vacation mode of operation pipe system 50 via activation of low flow/vacation mode switch 122, processor 106 is responsive activating flow sensor 60, opening electronic valve 74 of pipe 51 which stays open if already open, opening electronic valve 70 which says open if already open, and closing electronic valve 78 of sampling tube 52 that stays closed if already closed. Again, in the low flow/vacation mode no anticipated flow rate of pipe flow F1 through pipe 51 is anticipated. However, in response to flow sensor detecting a flow rate of pipe flow F1, whether in terms of flow velocity of pipe flow F1 in one embodiment and volumetric flow rate in another embodiment and both flow velocity and volumetric flow rate in yet another embodiment, flow sensor 60 is responsive sending a leak detecting signal to processor 106 which, in turn, is responsive issuing a signal to electronic valve 78 opening electronic valve 78 of sampling tube 52, and issuing a signal to electronic valve 70 closing electronic valve 70 between upstream and downstream ends 52A and 52B of sampling tube 52 diverting pipe flow F2 from pipe flow F1 to sampling tube 52 through upstream end 52A, which is capable of flowing through sampling tube 52 from upstream end 52A to downstream end 52B and back to pipe flow F1 of pipe 51 through downstream end 52B of sampling tube 52, and activating flow sensor 62, which is for generating output signals to control unit 53 that are a function of flow rate of pipe flow F2, whether in terms of flow velocity of pipe flow F2 in one embodiment and volumetric flow rate in another embodiment and both flow velocity and volumetric flow rate in yet another embodiment.

Again, because pipe 51 is a large diameter pipe relative to sampling tube 52, the reduced inner diameter D2 of sampling tube 52 compared to the comparatively larger inner diameter D1 of pipe 52 interacts with pipe flow F2 through sampling tube 52 by constricting pipe flow F2 thereby amplifying any flow rate of pipe flow F1 by accelerating any flow rate of pipe flow F1 through pipe 51 via pipe flow F2 through sampling tube 52 as discussed in detail above. Flow sensor 62 is in a safe state in response to no detected flow rate of pipe flow F2 through sampling tube 52, and is in a leak detecting state in response to sensing a flow rate of pipe flow F2 through sampling tube 52, again being an amplification of a flow rate of pipe flow F1 through pipe 51 so as to be detectable by flow sensor 62. Because pipe 51 is a large diameter pipe compared to sampling tube 52 being a comparatively smaller diameter pipe, a low flow rate of pipe flow F1 is potentially not be detectable by flow sensor 60, whereas the amplified flow rate of pipe flow F1 via pipe flow F2 through sampling tube 52 is comparatively more easily detectable by flow sensor 62 in sampling tube 52, in accordance with the principle of the invention.

In response to flow sensor 62 sensing a flow rate of pipe flow F2 through sampling tube 52, flow sensor 62 sends a leak detecting signal to processor 106 of control unit 53, and processor 106 is responsive activating control unit 53 signal devices as described above. If the occupant determines that there is a leak and the leak is repaired, the user may then select reset switch 126 reinitializing control unit 53 resetting pipe system 50 to, and recommencing, the low flow/vacation mode closing valve 78, deactivating flow sensor 62, activating flow sensor 60, and opening electronic valve 70. In the alternative, the user may select override switch 128 overriding the operation of control unit 53 for a predetermined override period of time, such as one hour, two hours, four hours, twelve hours, or other predetermined override period of time, which is timed by timer 110. At the close of the override period of time, timer 110 sends a resulting signal to processor 106, and processor 106 is responsive reinitializing control unit 53 resetting pipe system 50 to, and recommencing, the low flow/vacation mode.

In a particular embodiment, in the leak detecting state of flow sensor 62 sending the leak detecting signal to processor 106, processor 106 is responsive and sends a signal to electronic valve 74 closing electronic valve 74 halting pipe flow F1 through pipe 51 terminating a leak. At this point, pipe flow F1 through pipe 51 is restored by selecting reset switch 126 or override switch 128, whereby in response thereto in either case processor 106 is responsive sending a signal to electronic valve 74 opening electronic valve 74 restoring pipe flow F1 through pipe 51 and re-initializing control unit 53 resetting pipe system 50 to, and recommencing, the low flow/vacation mode of operation. In another embodiment in addition to or in lieu of electronic valve 74, in the leak detecting state of flow sensor 62 sending the leak detecting signal to processor 106, processor 106 is responsive sending a signal to electronic valve 78 closing electronic valve 78 halting pipe flow F2 through sampling tube 52 terminating a leak. At this point, pipe flow F2 through sampling tube 52 is restored by selecting reset switch 126 or override switch 128, whereby in response thereto in either case processor 106 is responsive sending a signal to electronic valve 78 opening electronic valve 78 restoring pipe flow F2 through sampling tube 52 and re-initializing control unit 53 resetting pipe system 50 to, and recommencing, the low flow/vacation mode of operation. Again, translation between the normal mode of operation and the low flow/vacation mode of operation is carried out via selection between normal mode switch 120 and low flow/vacation mode switch 122.

In the low flow/vacation mode of operation, a demand for water from pipe 51 may be called for downstream of sampling tube 52 via activation of a valve or faucet to a destination, such as a sink, a tube, a shower, etc. In this embodiment with reference to FIG. 1, a sensor 140 is operatively coupled to processor 106 via electrical wiring 80 and is coupled to sense movement of faucet/valve 141 between open and closed positions. In response to movement of faucet/valve 141 from a closed position to an open position causing a demand for water from pipe 51, sensor 140 sends a signal to processor 106 via electrical wiring 80, and processor 106 is responsive overriding the low flow/vacation mode triggering pipe system 50 to assume the normal mode of operation described above. In response to moving faucet/valve 141 from the open position to a closed position ceasing water demand, sensor 140 sends a resulting signal to processor 106, which is responsive resetting pipe system 50 to, and recommencing, the low flow/ vacation mode of operation.

Referring to FIGS. 2 and 3, processor 106 is programmed with instructions housed in storage 108 such that activation of auto mode switch 124 results in control unit 53 alternating operation between the normal mode of operation for a given period of time when demand for water from pipe 51 is expected, such as during daytime hours from, for example, from 5:00 a.m. to 10:00 p.m., and the low flow/vacation mode of operation when demand for water from pipe 51 is not expected, such as during nighttime hours, for example, from 10:00 p.m. to 5:00 p.m. Depending on user needs, processor 106 may be programmed via instructions housed in storage 108 to translate between the normal mode and low flow/ vacation mode at other defined intervals.

Control unit 53 is also operational in conjunction with remote transmitter 150. Remote transmitter 150 is a cellular device or appliance to issue a cellular message across a cellular network, or networked internet device or appliance to issue a networked message or computer-based message across a computer network, such as an Internet, that couples control unit 53 in signal communication with a remote device, such as a cellular telephonic device 151 in FIG. 2 to receive cellular messages from remote transmitter 150, such as a cellular phone or pager or the like, and/or a networked internet appliance, such as a networked individual subscriber unit, a computer 152, etc., as referenced in FIG. 2, to receive networked messages from remote transmitter 150. In response to caution/warning states of sensor 60, in a particular embodiment processor 106 is responsive sending caution/ warning alerts to cellular telephonic device 151 and/or computer 152 or the like, in the form of caution/warning email messages, text messages, audio files, etc., stored in storage 108 In response to the leak detecting state of sensor 62, in a particular embodiment processor 106 is responsive sending leak detection alerts to cellular telephonic device 151 and/or computer 152 or the like, again in the form of email messages, text messages, audio files, etc., stored in storage 108. In this embodiment of the invention, storage 108 is preprogrammed with one or more email address and one or more cellular phone numbers for sending emails and/or text messages and/ or audio files to intended recipients so as to alert the intended recipients of potential leaks.

Certain fixtures in a building construction periodically and automatically use water at intervals regardless of the mode of operation of control unit 53. Of particular significance is the low flow/vacation mode of operation of control unit 53, where there is no anticipated flow of pipe flow F1 through pipe 51. In a particular example, pipe 51 supplies pipe flow F1 in the direction of arrowed line A from upstream location 51A to downstream location 51B for application to an automatic ice maker found inside the freezer compartment of a refrigerator. Such an ice maker produces ice cubes from a mold. An electromechanical or electronic timer first opens a solenoid valve for a few seconds, such as 5-7 seconds, allowing the mold to fill with water from the domestic cold water supply, which in this example is pipe 51. The timer then closes the valve and lets the ice freeze for about thirty minutes. Then, the timer turns on a low-power electric heating element inside the mold for several seconds, seconds, to melt the ice cubes slightly so they will not stick to the mold. Finally, the timer runs a rotating arm that scoops the ice cubes out of the mold and into a bin, and the cycle repeats. If the bin fills with ice, the ice pushes up an arm, which shuts off the ice maker until the ice level in the bin goes down again. The user can also lift up the wire arm at any time to stop the production of ice. In the low flow mode of operation in this example, processor 106 is preprogrammed with instructions maintained in storage 108 that when executed by processor 106 operates control unit 53 in the following way. Namely, in concert with the operating cycle of the ice maker, processor 106 toggles from the low/ flow mode of operation of control unit 53 to the override mode of operation every 30 minutes for a window of approximately 10-30 seconds timed by timer 110, during which window the control unit 53 is disabled and ice maker solenoid valve opens for a few seconds, such as 5-7 seconds, allowing the mold to fill with water from the domestic cold water supply, which in this example is pipe 51. At the close of the window timed by timer 110 during which time ice maker is filled with water, processor 106 is responsive and sets control unit 53 back to the low flow mode operation re-enabling control unit 53 back to the low flow mode of operation. This process continues. Ice makers are one example of water use devices that periodically and automatically use water at intervals. Another example is toilets, which include valves that periodically open and close to replenish water to the toilet that is needed as a result of toilet water evaporation. Depending on how long it takes for a particular fixture that periodically and automatically use water at intervals, such as ice makers that periodically and automatically fill molds with water at intervals, and toilets that periodically and automatically replenish toilet water at intervals, the override window of time in this example can be varied or preselected.

The invention has been described above with reference to illustrative embodiments. Those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A pipe system, comprising:
   a pipe, the pipe contains a pipe flow;
   a sampling tube includes an upstream end coupled in fluid communication to an upstream portion of the pipe, and a downstream end coupled in fluid communication to a downstream portion of the pipe;
   the pipe has a first valve between the upstream end of the sampling tube and the downstream end of the sampling tube;
   the sampling tube has a second valve between the upstream end of the sampling tube and the downstream end of the sampling tube;
   a first sensor, the first sensor transmits a first signal, when the first sensor senses a first flow rate of the pipe flow through the pipe, the first signal being a function of the first flow rate;
   a control unit is operatively coupled to the first valve and the first sensor, the control unit closes the first valve halting the pipe flow through the pipe between the upstream and downstream ends of the sampling tube diverting a portion of the pipe flow to the sampling tube through the upstream end thereof, in response to the first signal from the first sensor;
   the sampling tube contains the portion of the pipe flow therethrough from the upstream end to the downstream end, when the control unit closes the first valve, the sampling tube for interacting with the portion of the pipe flow therethrough so as to form a second flow rate of the portion of the pipe flow being an amplification of the first flow rate, and for returning the portion of the pipe flow to the pipe through the downstream end;

a second sensor, the second sensor transmits a second signal, when the second sensor senses the second flow rate through the sampling tube being indicative of a leak, the second signal being a function of the second flow rate; and the control unit is operatively coupled to the second valve and the second sensor, the control unit closes the second valve halting the portion of the pipe flow through the sampling tube between the upstream and downstream ends of the sampling tube, in response to the second signal from the second sensor, terminating the leak.

2. The pipe system according to claim 1, wherein a signal device is operatively coupled to the second sensor for issuing an alert in response to the second signal from the second sensor.

3. The pipe system according to claim 2, wherein the signal device is an aural signal device, and the alert is an audible alert.

4. The pipe system according to claim 3, wherein the audible alert is a pre-recorded audible verbal message.

5. The pipe system according to claim 2, wherein the signal device is a visual signal device, and the alert is a visual alert.

6. The pipe system according to claim 5, wherein the visual alert is a pre-recorded text message.

\* \* \* \* \*